United States Patent
Hollon et al.

(10) Patent No.: US 8,616,003 B2
(45) Date of Patent: Dec. 31, 2013

(54) NOZZLE ASSEMBLY

(75) Inventors: Brian Hollon, Moncks Corner, SC (US); Adel B. Mansour, Mentor, OH (US); Erlendur Steinthorsson, Pepper Pike, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 1200 days.

(21) Appl. No.: 12/503,913

(22) Filed: Jul. 16, 2009

(65) Prior Publication Data

US 2013/0255264 A1 Oct. 3, 2013

Related U.S. Application Data

(60) Provisional application No. 61/082,329, filed on Jul. 21, 2008, provisional application No. 61/174,140, filed on Apr. 30, 2009.

(51) Int. Cl.
*F02C 1/00* (2006.01)

(52) U.S. Cl.
USPC .......................................... 60/742; 239/424.5

(58) Field of Classification Search
USPC ............ 60/737, 740, 742, 748; 239/422, 423, 239/424, 424.5, 428, 474, 475, 486, 487, 239/490, 491, 496, 497, 533.12, 549, 555, 239/556, 558, 560, 561
See application file for complete search history.

(56) References Cited

U.S. PATENT DOCUMENTS

| | | | |
|---|---|---|---|
| 3,477,647 A * | 11/1969 | Sharpe et al. | 239/468 |
| 3,881,701 A | 5/1975 | Schoenman et al. | |
| 4,911,340 A * | 3/1990 | Abom | 222/636 |
| 5,295,352 A | 3/1994 | Beebe et al. | |
| 5,435,126 A | 7/1995 | Beaudoin | |
| 6,047,539 A | 4/2000 | Farmer | |
| 6,499,674 B2 * | 12/2002 | Ren et al. | 239/407 |
| 6,691,518 B2 | 2/2004 | Doebbeling et al. | |
| 6,708,498 B2 | 3/2004 | Stickles et al. | |
| 6,763,663 B2 * | 7/2004 | Mansour et al. | 60/740 |
| 6,920,749 B2 | 7/2005 | Mansour et al. | |
| 6,962,055 B2 | 11/2005 | Chen et al. | |
| 2007/0075158 A1* | 4/2007 | Pelletier et al. | 239/11 |
| 2010/0192585 A1* | 8/2010 | Pelletier et al. | 60/742 |
| 2010/0236247 A1* | 9/2010 | Davis et al. | 60/742 |

* cited by examiner

*Primary Examiner* — Phutthiwat Wongwian

(74) *Attorney, Agent, or Firm* — Renner, Otto, Boisselle & Sklar, LLP

(57) ABSTRACT

A nozzle assembly comprises a first-fuel-inlet tube, a second-fuel-inlet tube, and a plate stack. The nozzle-plate stack (100) defines a central circuit, corner air circuits, a first fuel circuit and a second fuel circuit. The fuel circuits include a swirl chamber in which the fuel is swirled prior to being merged with the central circuit. The corner air circuits merge with the central circuit downstream of the fuel circuits' merge and provide an additional swirling component to further shape the fuel-air stream prior to ignition.

20 Claims, 18 Drawing Sheets

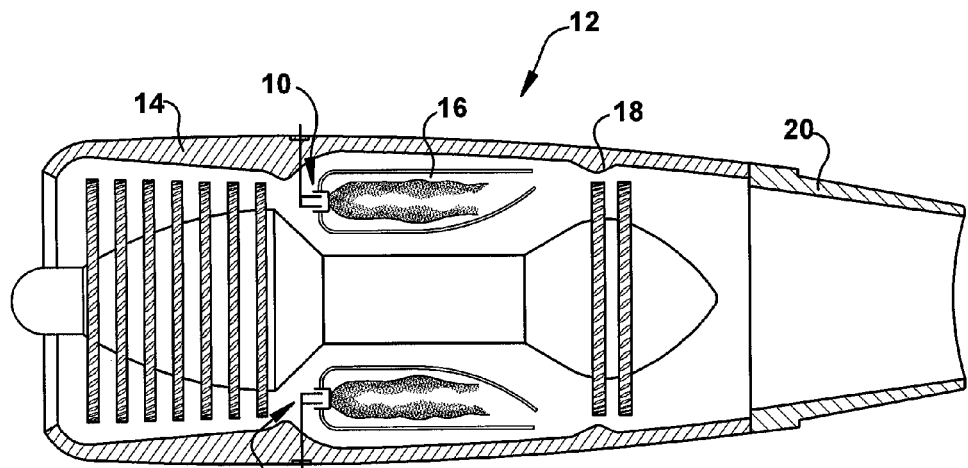
Figure 1
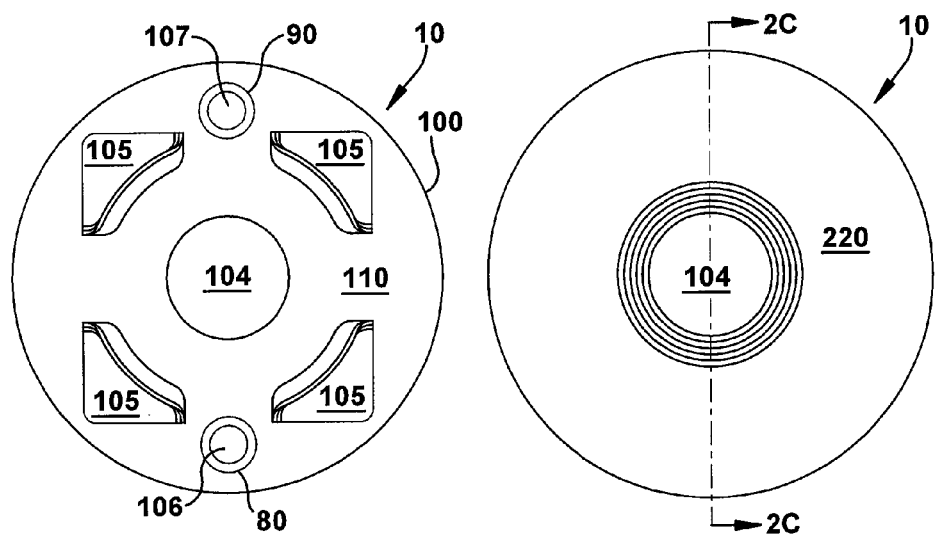
Figure 2A
Figure 2B

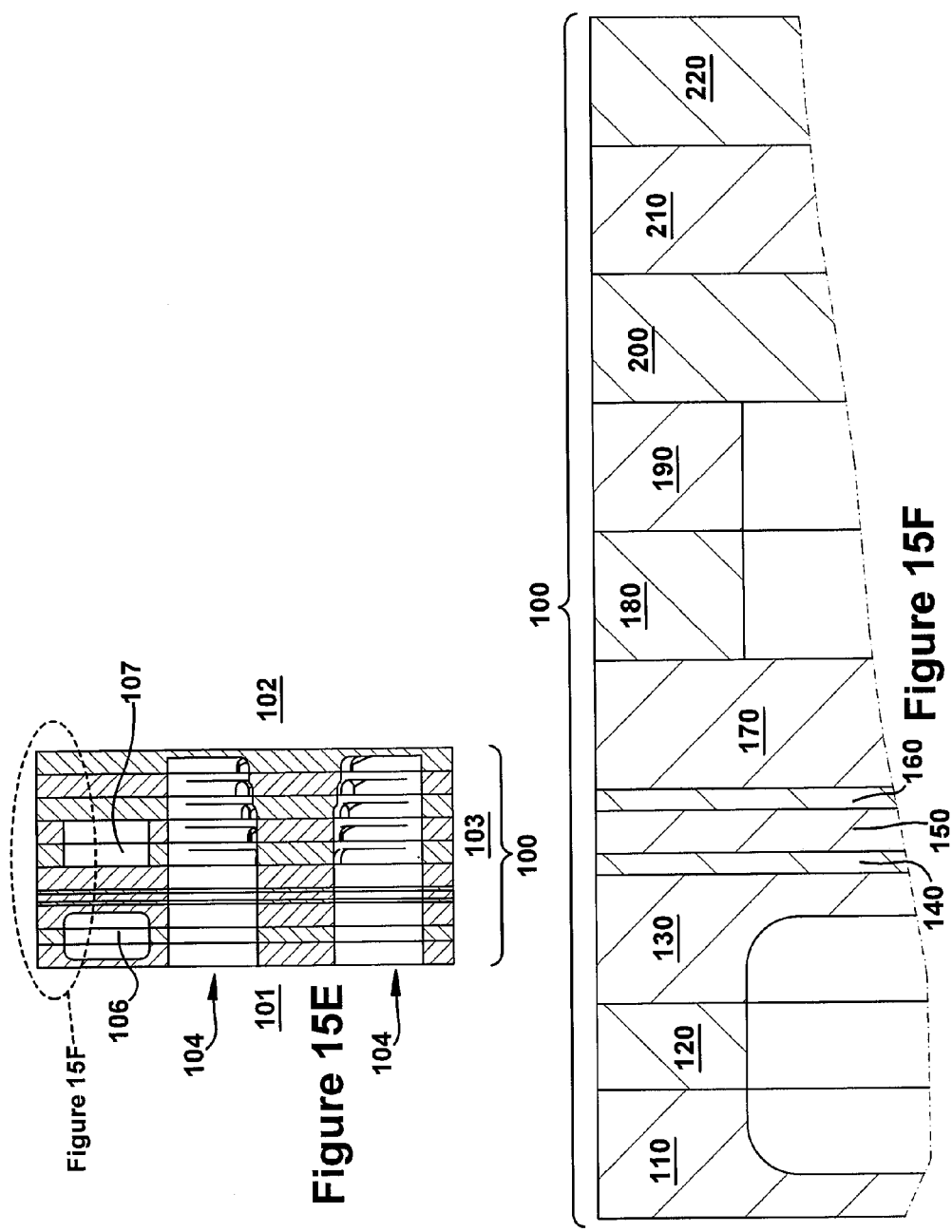

NOZZLE ASSEMBLY

RELATED APPLICATIONS

This application claims priority under 35 U.S.C. §119 (e) to U.S. Provisional Patent Application No. 61/082,329 filed on Jul. 21, 2008 and U.S. Provisional Patent Application No. 61/174,140 filed on Apr. 30, 2009. The entire disclosures of these provisional applications are hereby incorporated by reference. If incorporated-by-reference subject matter is inconsistent with subject matter expressly set forth in the written specification (and/or drawings) of the present disclosure, the latter governs to the extent necessary to eliminate indefiniteness and/or clarity-lacking issues.

BACKGROUND

A gas turbine engine typically includes one or more fuel injectors. A fuel injector for such an application can comprise a nozzle assembly mounted just downstream of the engine's compressor section. The fuel injector can be adapted to suitably mix fuel and air, and it can be positioned to direct fuel into the appropriate regions of engine's combustion chamber.

SUMMARY

A nozzle assembly is provided that can function, for example, as a fuel injector in a gas turbine engine. The nozzle assembly can be constructed to occupy a very small envelope and still supply a uniform mixture of fuel and air. In this manner, peak combustion temperatures can be reduced, thereby minimizing the temperature-sensitive production of thermal NOx. As such, the nozzle assembly may be an attractive candidate for fuel injection when ultra-low emission combustion is required. The nozzle's small spatial scale (without a compromise in mixture uniformity) can also translate into a reduction in reaction residence time, and the production of compact flames. The nozzle assembly may also open opportunities for high-flame-speed fuels, as reduced residence time may essentially eliminate the risk of auto-ignition.

DRAWINGS

FIG. 1 is a schematic illustration showing nozzle assemblies installed in a gas turbine engine for fuel injection.

FIGS. 2A-2F are upstream, downstream, sectional, and close-up views of a single-central-circuit nozzle assembly.

FIGS. 15A-15F are upstream, downstream, sectional, and close-up views of a multi-central-circuit nozzle assembly.

Figure 2C:
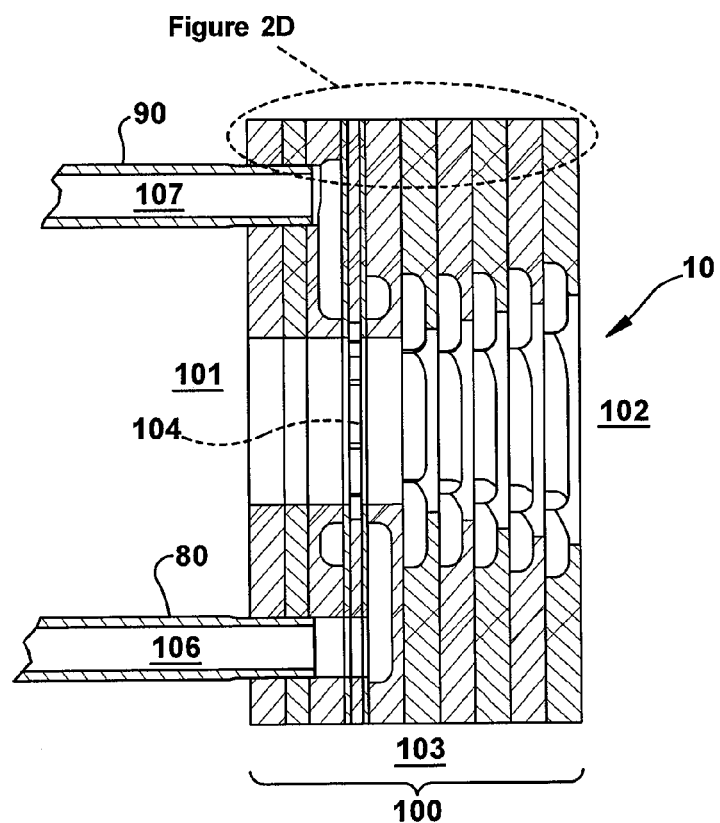
Figure 2D:
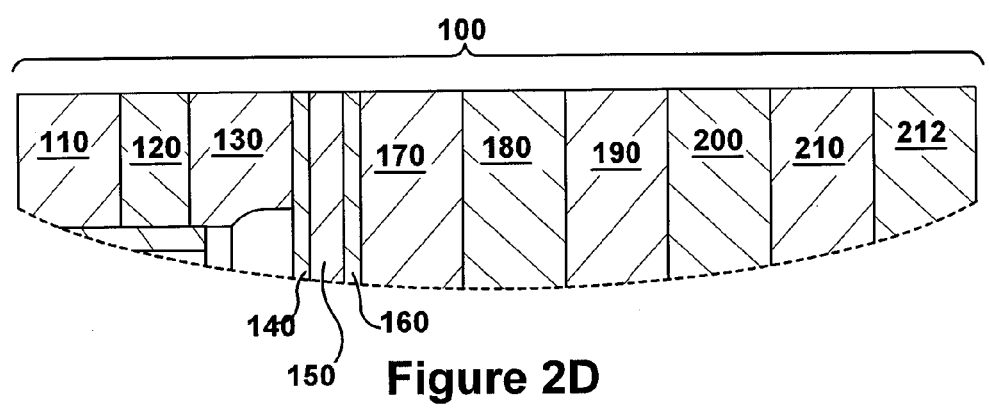

FIGS. 16A-16B, 17A-17B, 18A-18B, 19A-19B, 20A-20B, 21A-21B, 22A-22B, 23A-23B, 24A-24B, 25A-25B, 26A-26B, and 27A-27B are each upstream and side views of nozzle plates in the multi-central-circuit assembly.

DESCRIPTION

A nozzle assembly 10 is shown installed in a gas turbine engine 12 in FIG. 1. The illustrated engine 12 generally comprises a compressor section 14, a combustion chamber 16, a turbine section 18, and an exhaust section 20. The nozzle assembly 10 can be mounted just downstream of the compressor section 14 to direct (or inject) a fuel-air mixture into radial outer regions of the combustion chamber 16. The gas turbine engine 12 can be, for example, an engine in an aircraft, and temperatures within the combustion chamber 16 can reach as high as 1300° F.

The nozzle assembly 10, shown in more detail in FIGS. 2A-2F, comprises a first-fuel-inlet tube 80, a second-fuel-inlet tube 90, and a plate stack 100. The plate stack 100 (which has an upstream side 101, a downstream side 102, and a surrounding side 103) strategically forms the fluid circuitry of the nozzle assembly 100. Specifically, the nozzle-plate stack 100 defines a central circuit 104, corner air circuits 105, a first fuel circuit 106 and a second fuel circuit 107.

During operation of the nozzle assembly 100, air is drawn through the central circuit 104 and the corner air circuits 105 from the engine's compressor section 14. The inlet tube 80 supplies fuel to the first fuel circuit 106 and the inlet tube 90 supplies fuel to the second fuel circuit 107. The circuits 106-107 can supply the same fuel (e.g., jet fuel supplied from a common tank), with the first circuit 106 only being used during start-up or low power conditions and both circuits 106-107 being used during high power conditions. (A staged fuel supply such as this is a common requirement for a gas turbine engine in an aircraft application.)

The nozzle-plate stack 100 comprises a plurality of plates 110-220 (i.e., plates 110, 120, 130, 140, 150, 160, 170, 180, 190, 200, 210, 220) each having openings and at least some having grooves that collectively form the circuits 104-107. In the context of the current discussion, the term "opening" refers to an aperture that extends completely through the plate thickness, while the term "groove" refers to a recess that extends only partially through the thickness of the plate.

The nozzle assembly 10 preferably includes at least five plates, at least ten plates, and/or at least twelve plates in its stack 100 and the plates preferably all have the same plan shape. The plate stack 100 illustrated in the $2^{nd}$ drawing set has a cylindrical geometry whereby the individual plates have a circular or disc shape. Each plate preferably includes at least one opening and has a perimeter edge (e.g., a circumferential edge in a circular plate) that does not form any part of a flow-defining opening and/or groove. In other words, each opening/groove is surrounded by plate material and there are no "open-to-the-edge" openings or grooves. The ungrooved surfaces of the upstream and downstream sides of each plate are preferably planar and parallel, with no projections extending outwardly therefrom.

The specific arrangement of the openings and grooves in each of the nozzle plates in the stack 100 can be best seen be referring additionally to FIGS. 3-14. The upstream-most plate 110 (FIGS. 3A-3B) comprises a central opening 112, corner air openings 114, a first-fuel-circuit opening 116, and a second-fuel-circuit opening 118. The central opening 112 is circular and the dominating feature on the plate 110. The corner openings 114 are each roughly right-triangular in shape (with a rounded hypotenuse) and they are arranged in a quadrant-fashion around the central opening 112. The fuel circuit openings 116 and 118 are each circular (although much smaller than the central opening 112) and they are diametrically positioned outside the central opening 112 and between adjacent pairs of the corner air openings 114.

The next plate 120 (FIGS. 4A-4B) comprises similar openings 122, 124, 126 and 128, aligned respectively, with the openings 112, 114, 116, and 118 on the plate 110.

The following plate 130 (FIGS. 5A-5B) also comprises openings 132, 134, 136 and 138 that align with the openings 112/122, 114/124, 116/126, and 118/128 in the upstream plates 110/120. The upstream surface of the plate 130 additionally includes a rim 133 and a groove 137. The rim 133 surrounds the central opening 132, and the groove 137 peninsulas inward from the first-fuel-circuit opening 136 and surrounds the rim 133.

The next three plates 140, 150, 160 (FIGS. 6A-6B, 7A-7B, 8A-8B) each comprises a central opening (142,152,162) corner air openings (144, 154, 164), and a second-fuel-circuit opening (148, 158, 168). These openings align with the corresponding openings in the upstream plates 110-130. The plate 140 (FIG. 7A) also includes a circular array of small openings 147 (e.g., eight openings) that align with the circular portion of the groove 137 in the plate 130. The plate 160 (FIG. 9A) includes a similar circular array of openings 169 aligned with the openings 147.

The plate 150 (FIG. 7A) also includes a series of swirl spokes 157 aligned with the openings 147 and 169 in plates 140 and 160. More specifically, each spoke 157 has a radially outer end pod and a leg extending radially inwardly therefrom to the central opening 152. The spokes' end pods are aligned with the arrayed openings 147 and 169 in the plates 140 and 160. The legs are each sloped about the circumference (i.e., non-perpendicular thereto) of the opening 152 and travel radially thereto in a pinwheel-like pattern. Fluid traveling radially inward through the spokes' legs will be introduced into the central opening 152 almost tangentially to create a swirling action therein.

The following plate 170 (FIGS. 9A-9B) has a central opening 172 and corner air openings 174 that align with the central openings 112-162 and the corner openings 114-164 in the plates 110-160 upstream thereto. The downstream surface of the plate 170 additionally includes a rim 173 (surrounding the central opening 172). A groove 179 peninsulas inward from the second-fuel-circuit opening 178 and then surrounds the rim 173.

The next plate 180 (FIGS. 10A-10B) has a central opening 182 and corner air openings 184. The central opening 182 is aligned with the central openings 112-172 of the upstream plates 110-170 but has a slightly larger diameter (see FIG. 2E). The corner air openings 184 are aligned with corresponding corner openings 114-174 in the upstream plates 110-170, but their rounded hypotenuse sides are more truncated there than (see FIG. 2F).

The plate 180 additionally includes a grooves 185 on its downstream side forming swirl spokes. The grooves 185 each connect to the hypotenuse side of the respective corner air opening 184 and narrow as they extend radially inward to the central opening 182. The grooves' paths to the central opening 182 are angled (i.e., non-perpendicular) relative to the intersecting circumference. Air travels radially inward from the corner openings 184 in a pinwheel-like fashion and enters the central opening 182 at almost tangential orientation.

The next three plates 190, 200, 210 (FIGS. 11A-11B, 12A-12B, 13A-13B) have similar central openings (192, 202, 212), similar corner air openings (194, 204, 214) and similar swirl grooves (195, 205, 215). The central openings 192, 202, 212 in the illustrated plates 190-210 grow progressively larger in diameter in the downstream direction (see FIG. 2E). Additionally or alternatively, the corner air openings 194-214 can decrease in dimension in this direction.

Figure 2E:
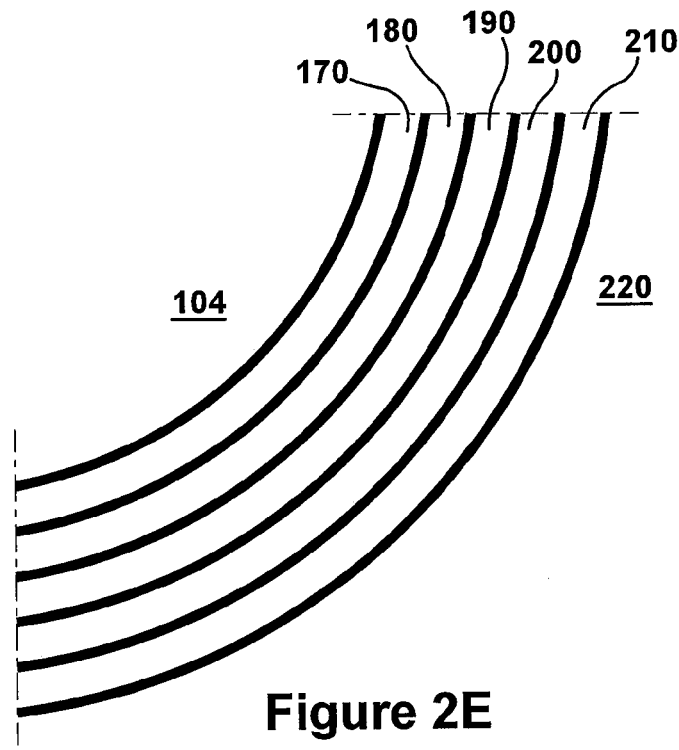
Figure 2F:
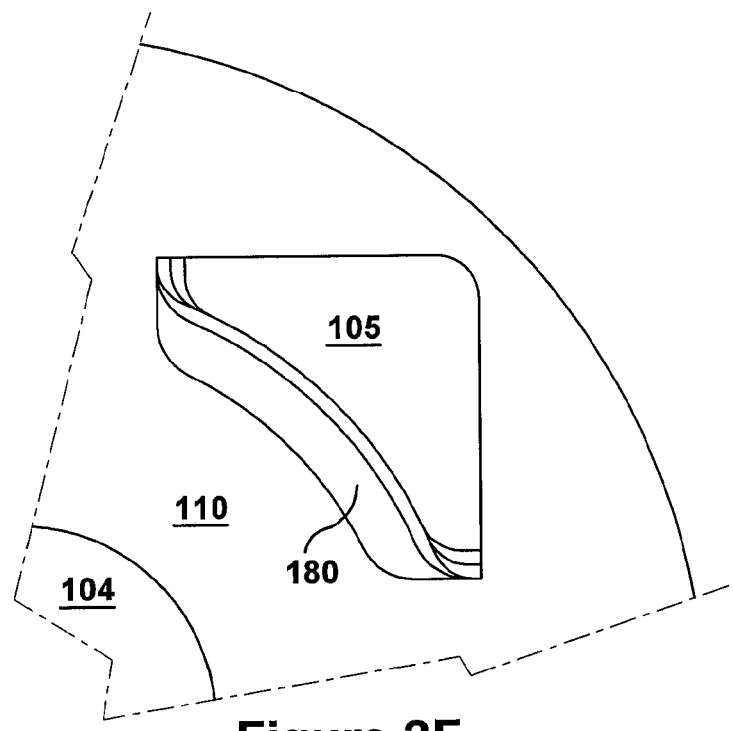
Figure 3A:
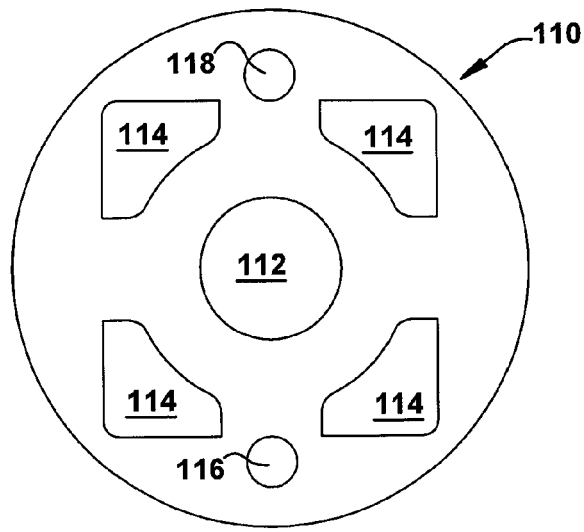
FIGS. 3A-3B, 4A-4B, 5A-5B, 6A-6B, 7A-7B, 8A-8B, 9A-9B, 10A-10B, 11A-11B, 12A-12B, 13A-13B and 14A-14B are each upstream and side views of nozzle plates in the single-central-circuit assembly.
Figure 3B:
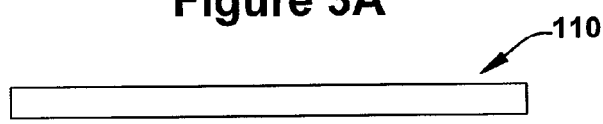
Figure 4A:
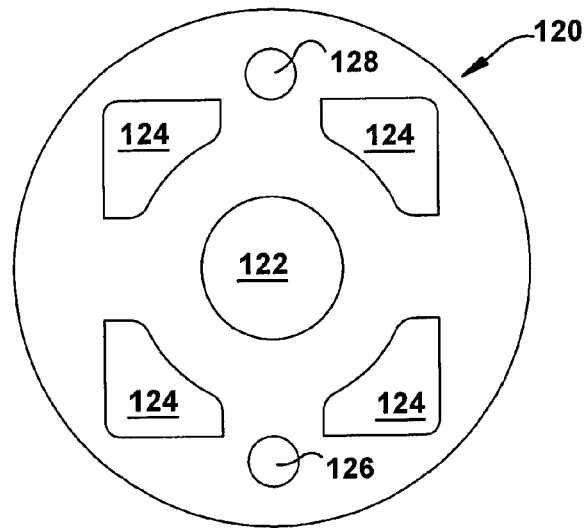
Figure 4B:
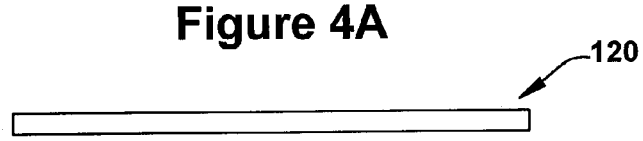
Figure 5A:
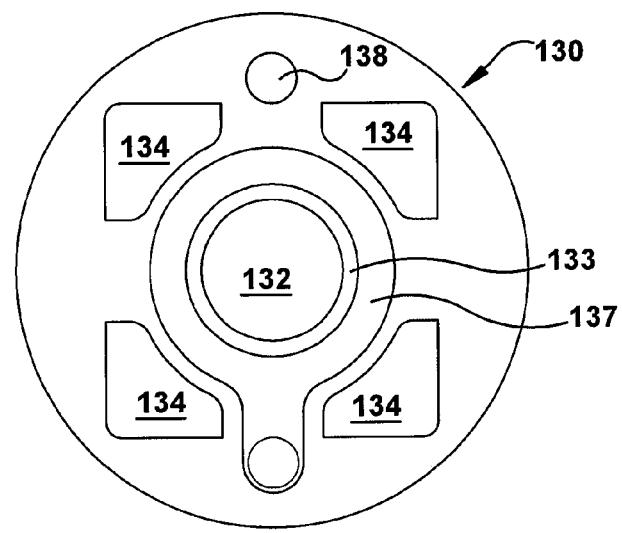
Figure 5B:
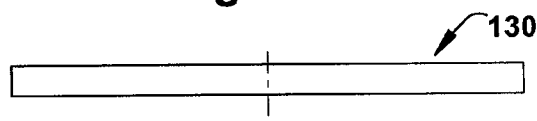
Figure 6A:
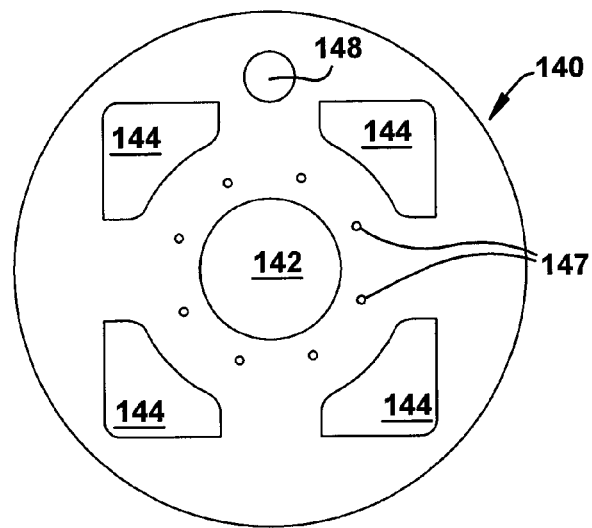
Figure 6B:

The downstream-most plate 220 (FIGS. 14A and 14B) has a central opening 222 that is aligned with, but larger in diameter than the central opening 212 in the adjacent plate 210 (see FIG. 2E). The plate 220 also includes grooves 224 and grooves 225 on its downstream side. The grooves 224 are aligned with the corner air openings 184-214 in the plates 180-220 and the grooves 225 are aligned with their swirl grooves 185-215.

Figure 14A:
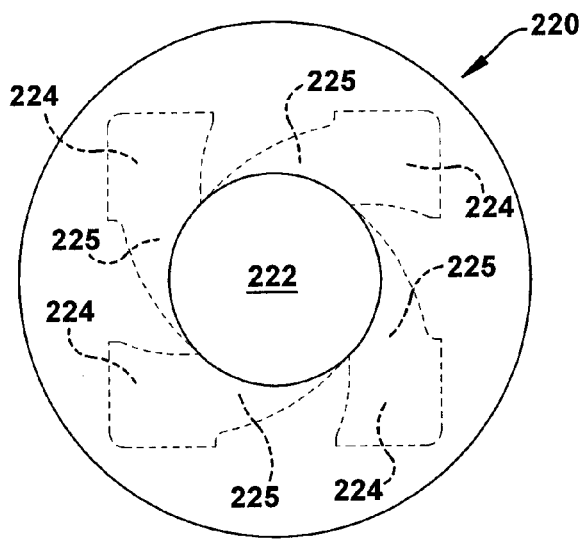
Figure 14B:
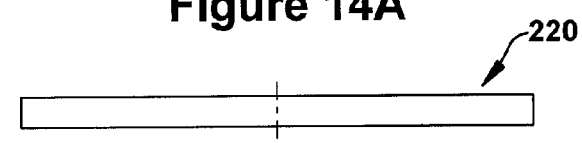
Figure 15A:
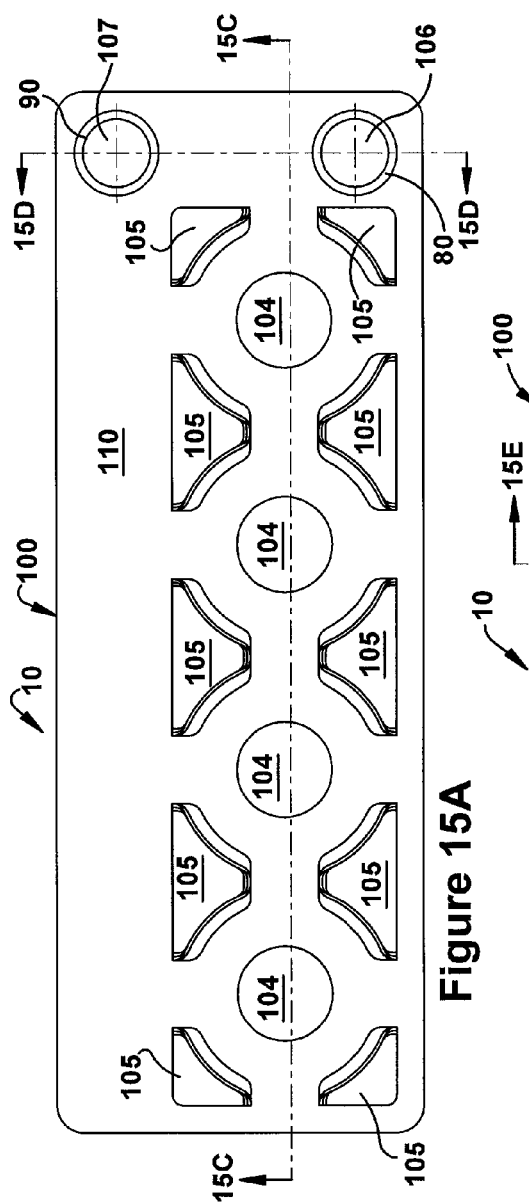
Figure 15B:
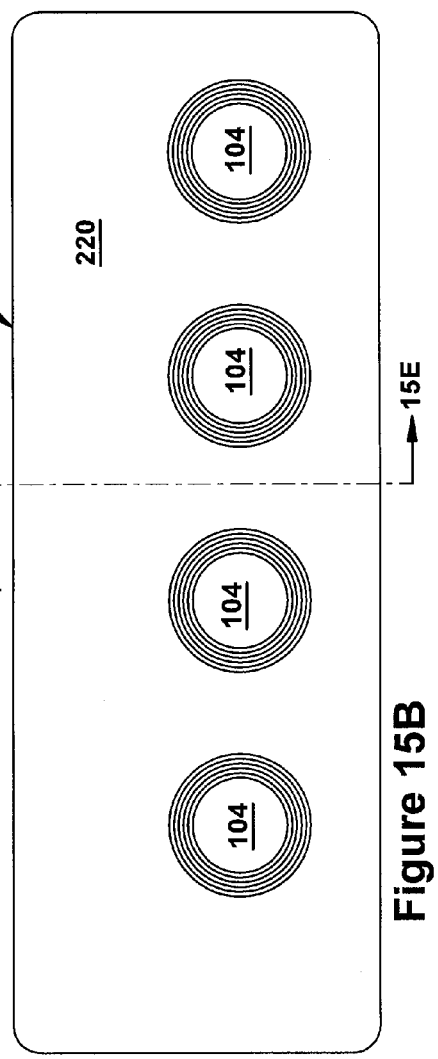
Figure 15C:
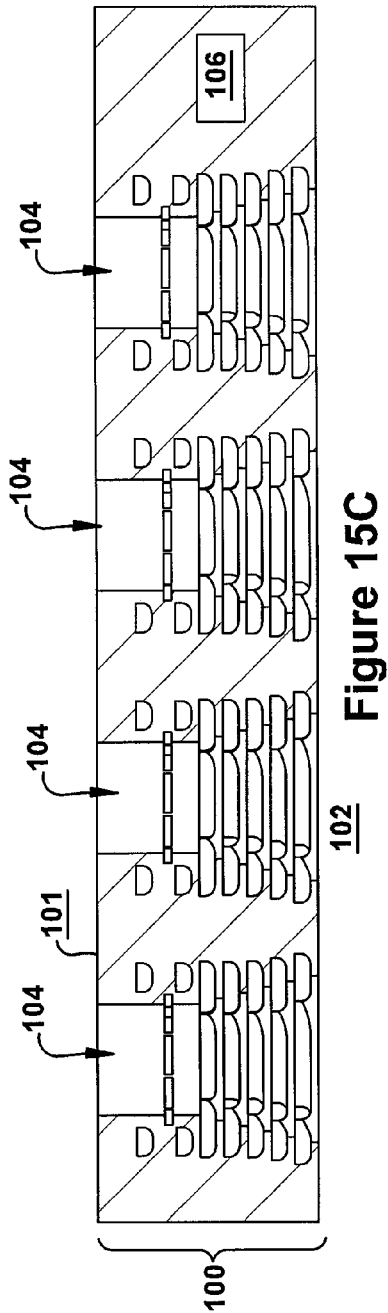
Figure 15D:
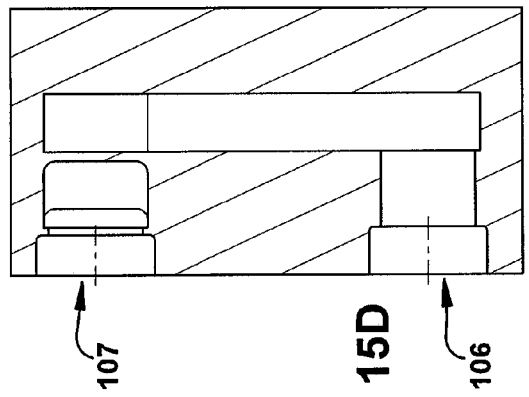
Figure 16A:
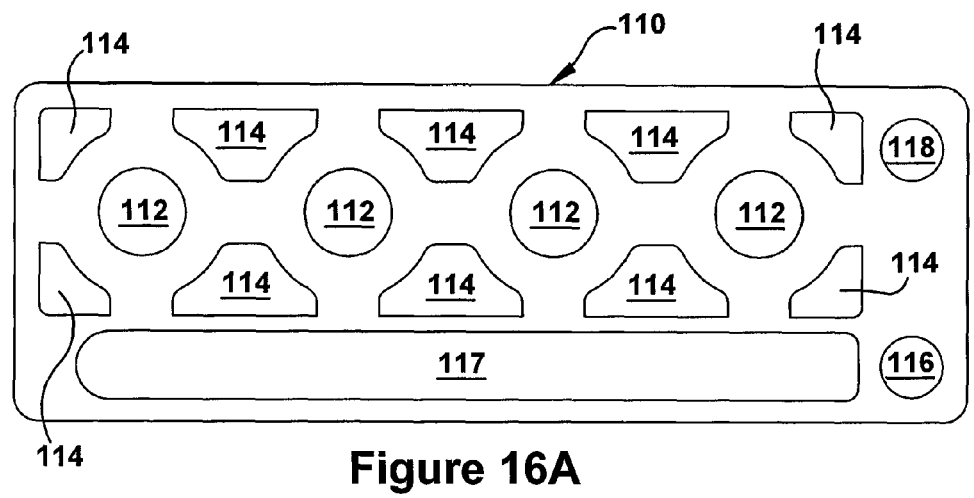
Figure 16B:
Figure 17A:
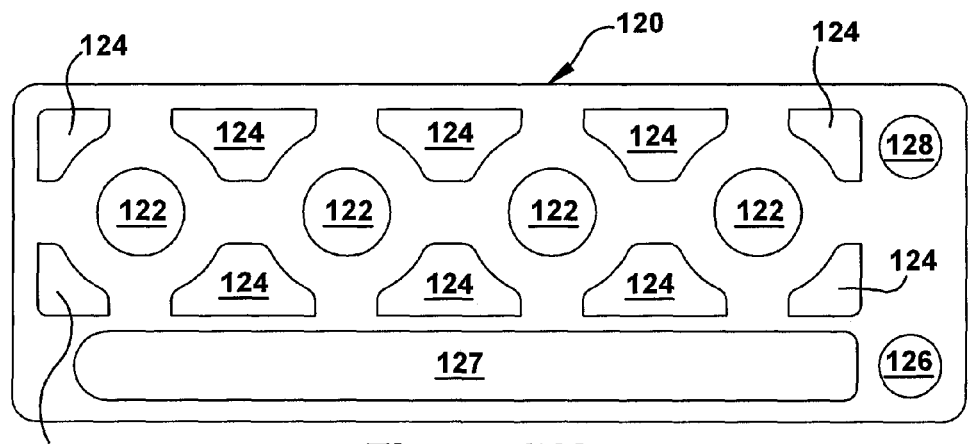
Figure 17B:
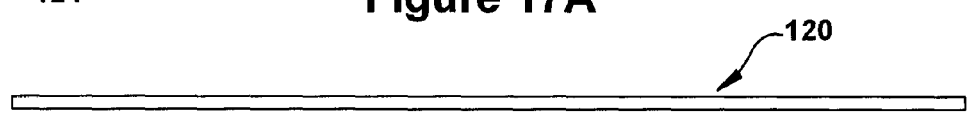
Figure 18A:
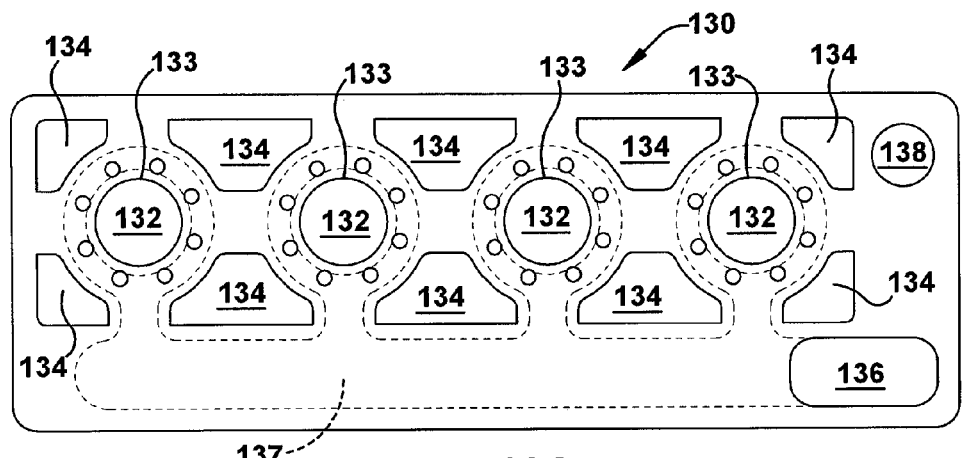
Figure 18B:
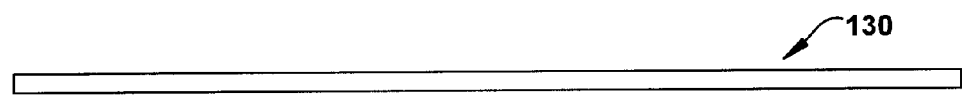
Figure 19A:
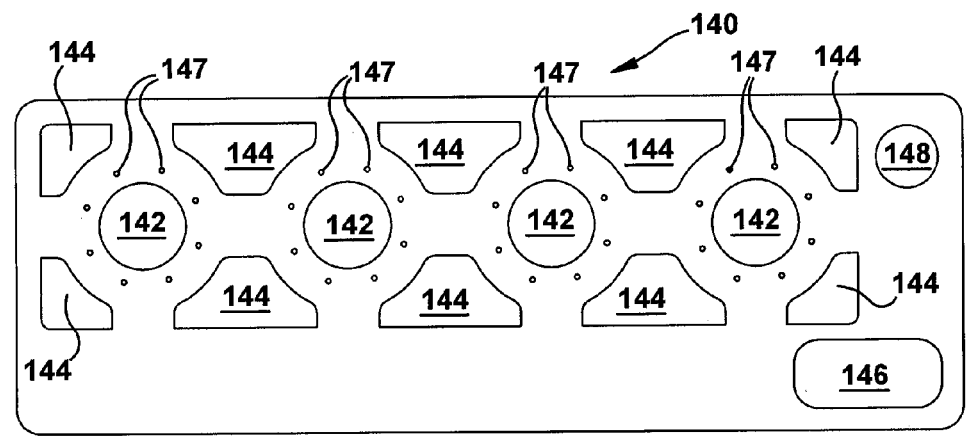
Figure 19B:
Figure 20A:
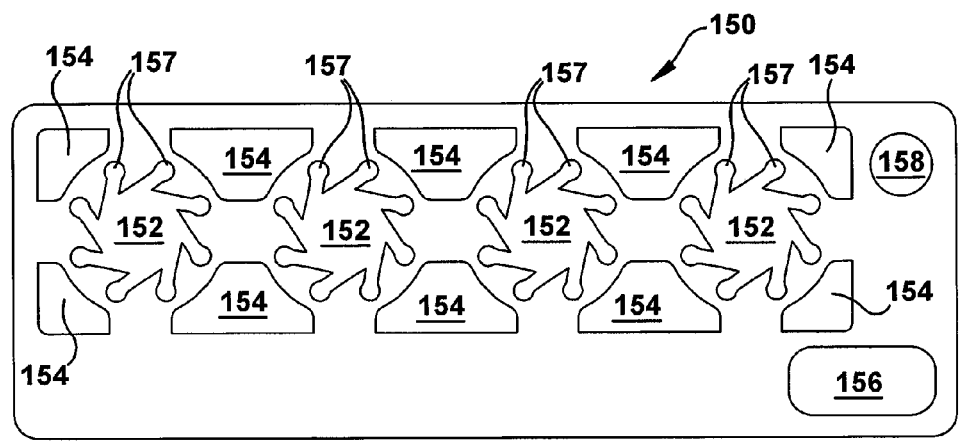
Figure 20B:
Figure 21A:
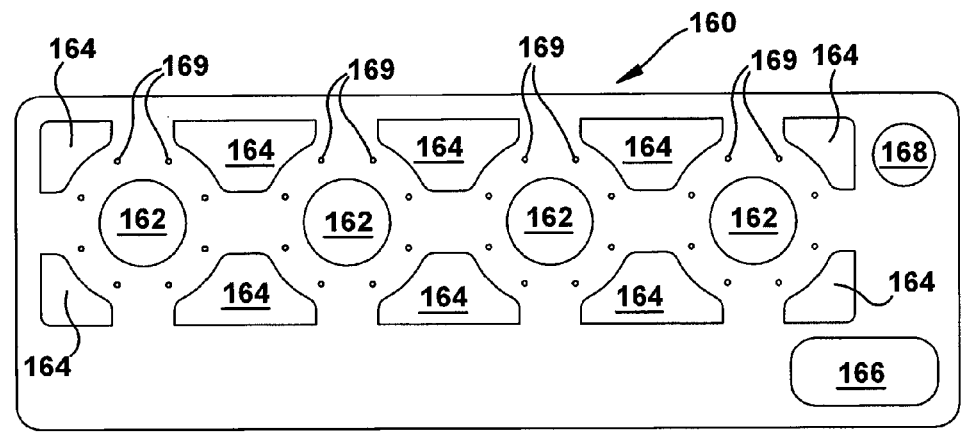
Figure 21B:
Figure 22A:
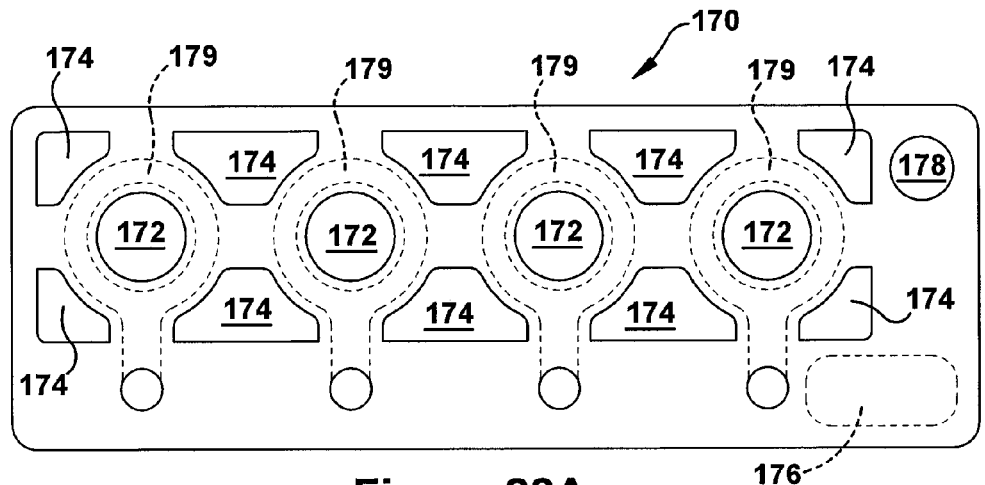
Figure 22B:
Figure 23A:
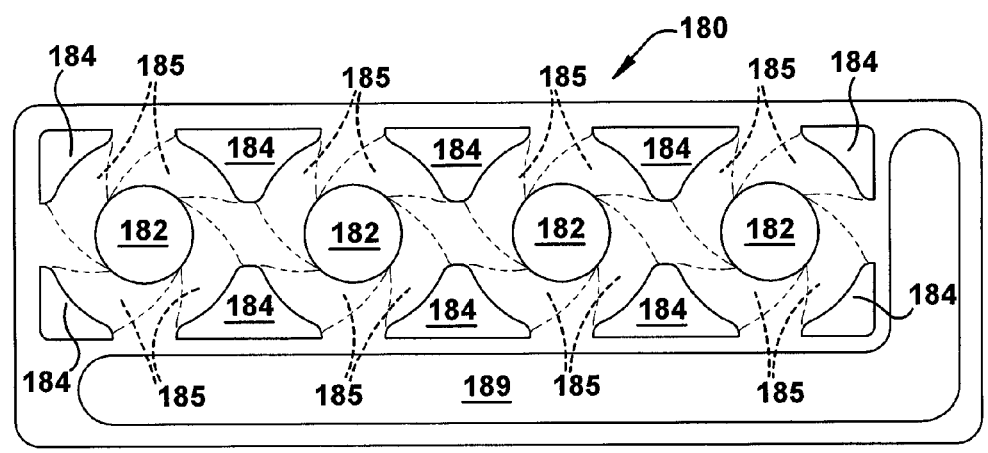
Figure 23B:
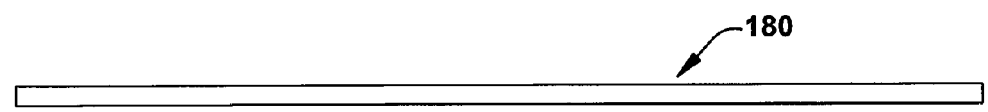
Figure 24A:
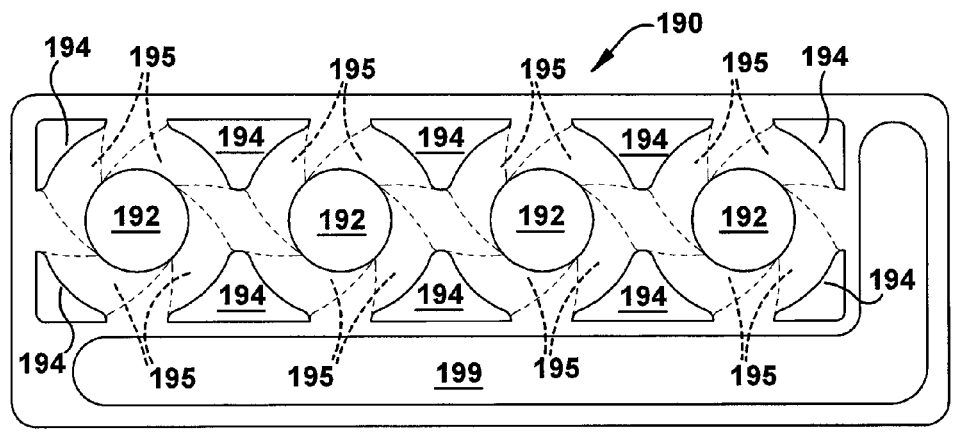
Figure 24B:
Figure 25A:
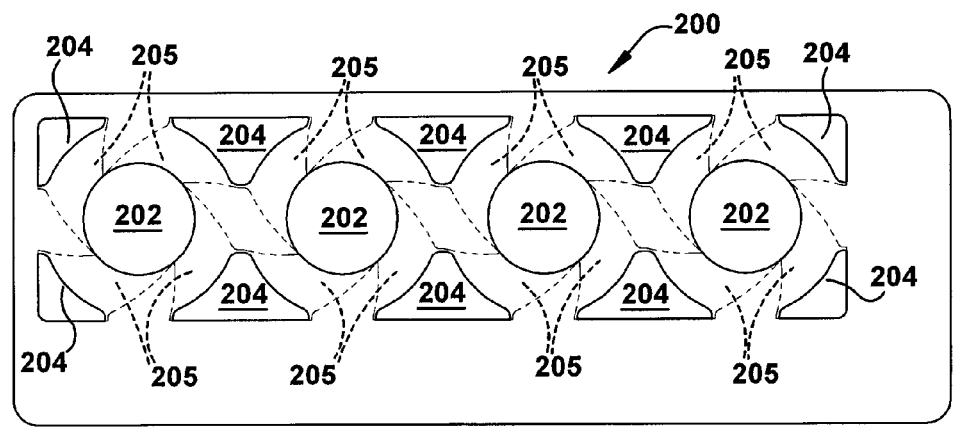
Figure 25B:
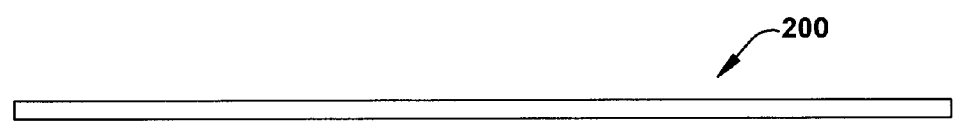
Figure 26A:
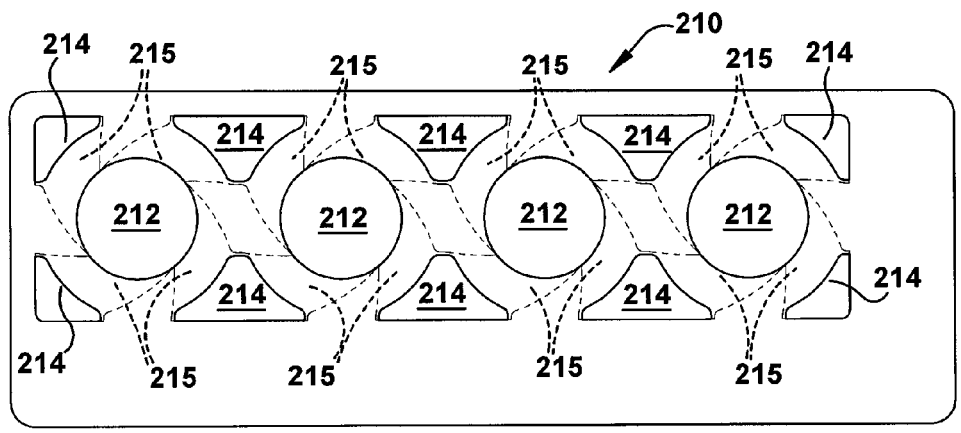
Figure 26B:
Figure 27A:
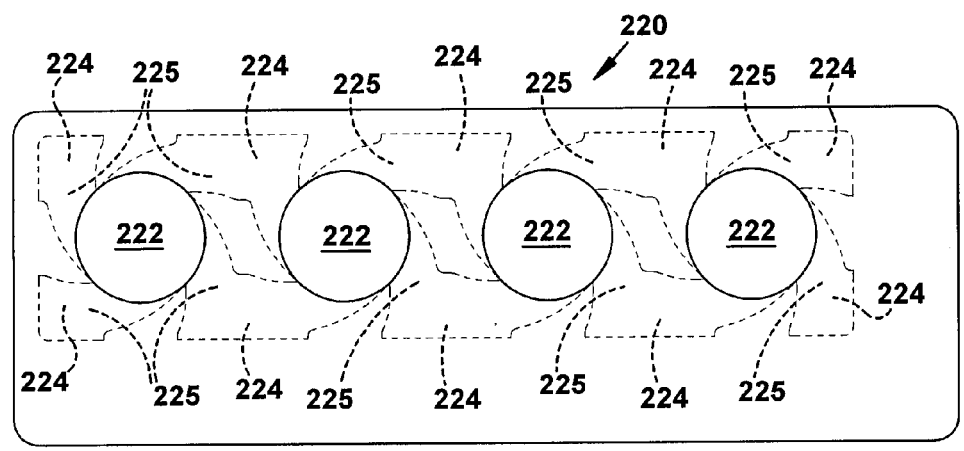
Figure 27B:
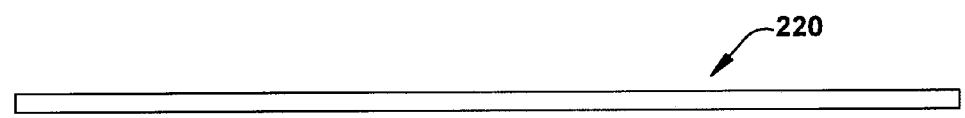

The central circuit 104 of the nozzle assembly 10 (and/or the nozzle-plate stack 100) is formed by the central openings 112-222 in the plates 110-220. Air that enters the central opening 112 in the upstream-most plate 110 (FIG. 3A) will travel through the central openings of the following plates until exiting through the central opening 222 in the downstream-most plate 220 (FIG. 14A). This central-circuit air will, however, be joined by fluid from the other circuits 105-107 along the way.

The corner air circuits 105 are formed by the corner openings 114-214 in the plates 110-210. These circuits merge with the central circuit 104 prior to exiting the downstream most plate 220, thanks to the swirl grooves 185-225 on the plates 180-220.

Figure 7A:
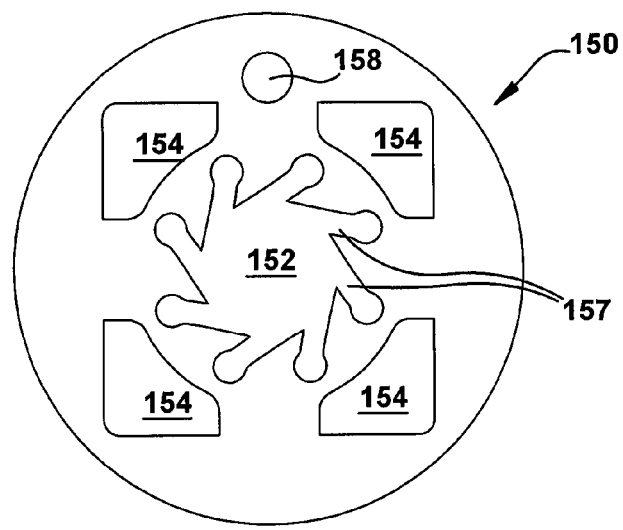
Figure 7B:
Figure 8A:
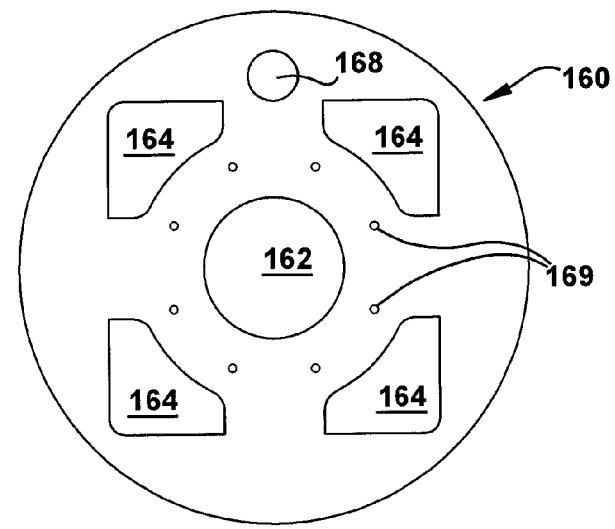
Figure 8B:

The first fuel circuit 106 is formed by the openings 116-126 in upstream plates 110-120, in conjunction with features that merge this fuel circuit 106 into the central circuit 104. Specifically, fuel (e.g., supplied by the inlet tube 80) flows into the pre-swirl distribution groove 137 in plate 130 (FIG. 5A), through the hole array 147 in plate 140 (FIG. 6A), and into the swirl spokes 157 in plate 150 (FIG. 7A). The first-circuit fuel then flows through spokes 157 and is swirled into the central opening 152 and thus into the first circuit 104. The merged fuel mixes with the central-circuit air and travels downstream therewith through the first circuit 104. (And, as is explained in the following paragraph, fuel from second circuit 107, when used during high power conditions, joins fuel in the first circuit 106 prior to this merge.)

Figure 9A:
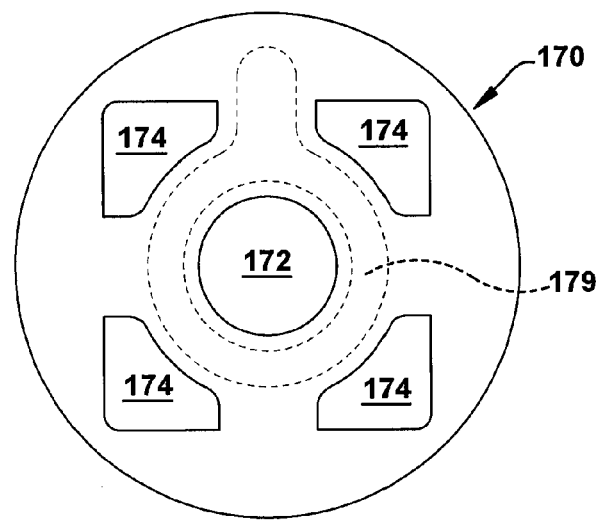
Figure 9B:
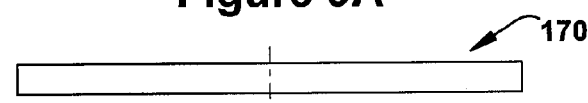
Figure 10A:
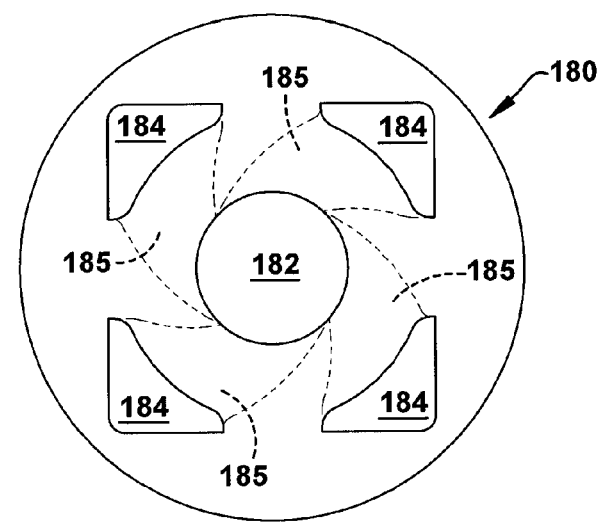
Figure 10B:
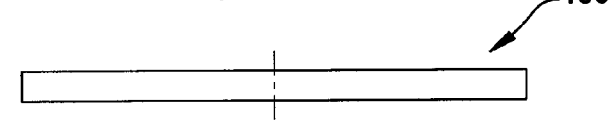
Figure 11A:
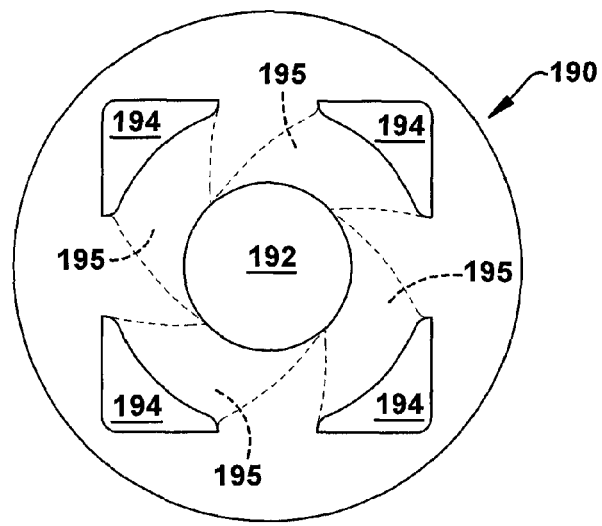
Figure 11B:
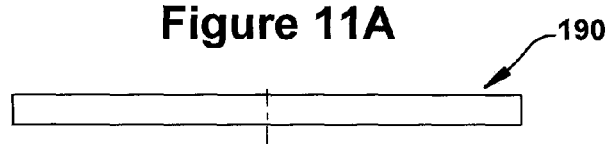
Figure 12A:
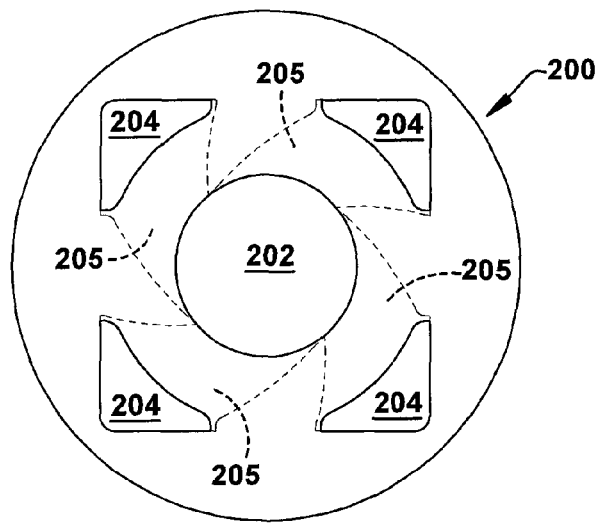
Figure 12B:
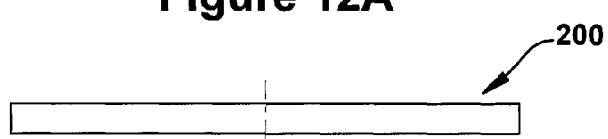
Figure 13A:
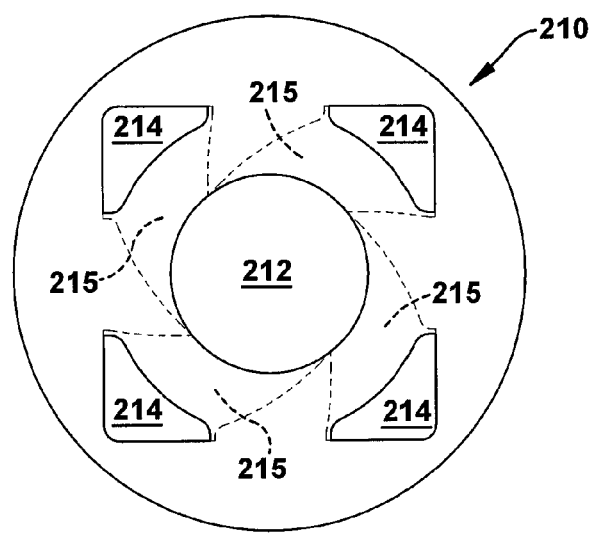
Figure 13B:
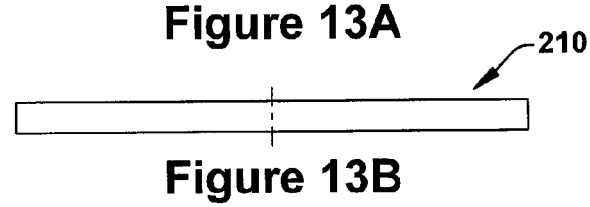

The second fuel circuit 107 is formed by the openings 118-168 in the upstream plates 110-160, in conjunction with merge features allowing its introduction into the central circuit 104. Fuel (e.g., supplied by the inlet tube 90) flows into the pre-swirl distribution groove 179 in the plate 170 (FIG. 9A). The second-circuit fuel then travels (temporarily in the upstream direction) through the hole array 169 in plate 160 (FIG. 6A) into the swirl spokes 157 in plate 150 (FIG. 7A) whereat it joins the first-circuit fuel. The first-circuit fuel and the second-circuit fuel then together flow through the spokes 157 and are swirled into the first circuit 104 (e.g., through the central opening 152).

As was indicated above, the corner air circuits 105 merge with the central circuit 104 prior to exiting the downstream most plate 220, courtesy of the swirl grooves 185-225 in the preceding plates 180-220. This corner-air merge occurs downstream of the merge (and mixture) of the fuel circuits 106-107 with the first circuit 104. In this manner, this later-introduced corner air can impart an additional swirling component to the air-fuel mixture in the central circuit 104, to thereby further shape and compact the air-fuel stream prior to ignition. This can further facilitate the creation of compact (e.g., thin, sleek, etc.) flames in the engine's combustion chamber.

The nozzle assembly 10 (and/or the nozzle-plate stack 100) shown in the $2^{nd}$ drawing set had a single-central-circuit design, with only one central circuit 104. The nozzle assembly 10 shown in the $15^{th}$ drawing set (FIGS. 15A-15F) has a multi-central-circuit design which, in the illustrated embodiment, essentially arranges four sets of the fluid circuits 104-107 in a row. This assembly 10 can be made of rectangular (rather than circular) plates 110-220 as individually shown in the $16^{th}$ through $27^{th}$ drawing sets. With such a multi-circuit design, adjacent corner features 114-224 and 185-225 can be melded together as shown. Also, the plates 110-220 may need to further form channels within the fuel circuits 106-107 (e.g., opening 117 in plate 110, opening 127 in plate 120, and openings 146-176 in plates 140-170, opening 189 in plate 180 and elongated opening 199 in plate 190) to disperse fuel along the length of the nozzle assembly 10. Otherwise, the plate features and flow patterns can remain essentially the same as in the circular single-outlet opening embodiment discussed above.

The diameter or other plan dimensions of the plates in the stack 100 can be determined by the intended use of the nozzle assembly 10, although size restrictions may often be inherent in the selected forming technique and/or desired flow circuit arrangement. For example, circular plates can each have a diameter which is in the range of 0.5 to 1.0 inch and, in any event, less than 3 inches. The rectangular plates can have an analogous width and a length in the range of 2.0 to 4.0 inches (e.g., less than 10 inches).

The nozzle plates can be made of any suitable material in which, in many cases, will be a metal material. For example, the plates/sheets can be made of stainless steel, nickel-based metals, and/or other ferrous-based metals. Non-ferrous metal materials (e.g., aluminum) and also non-metal materials (e.g., ceramic) could also be candidates for the plate/sheet material. In lower temperature applications, polymer and/or plastic (e.g., thermoplastic) material can be used. The plates can all be made of the same or different material. The selection of materials, and/or the use of the same or different materials, will usually be based on the intended use of the nozzle assembly 10, the technique used to form the openings and grooves in individual plates, and/or the process used to join the plates together.

The plates can have the same or different thicknesses, and the plate thickness is selected according to the intended application and/or the technique used to form the openings and grooves. Certain forming techniques may favor as thin a plate as possible. However, lower limits are sometimes imposed by the size and/or placement of the openings and grooves, as the plate material around and between the openings/grooves must be capable of structurally supporting and separating the circuits. For this reason, the plates (containing both openings and grooves must sometimes be thicker than those containing only openings.

In the illustrated embodiments, for example, the plates 110, 130 and 170-220 can be twice as thick as the plate 120, and substantially thicker than the plates 140-160. With particular reference to plate 140 and plate 160, an extremely thin geometry (and thus short through path) may be advantageous due to the small-hole arrays 147 and 167 carried by these plates. Additionally or alternatively, the plate 150 may benefit from a small geometry in view of its swirl-spoke features 157. Generally, at least some of the plates will be less than about 0.25 inch thick.

The openings and grooves can be formed on the plate material by any suitable method which provides the needed accuracy and/or precision. For example, etching, milling, laser or otherwise cutting, electric discharge or otherwise machining, water jetting and/or stamping can be employed. These and other forming techniques can be used, provided they can provide the precision and/or edge smoothness required.

In some situations, it may be desirable to use different forming methods on different plates/sheets. For example, the openings on upstream plates 110-120 may be such that less precision can be tolerated whereby they could be formed by one method although other plates would require the precision provided by another method. Additionally or alternatively, it may be desirable to use different forming methods for different openings or grooves on the same plate/sheet. For example, the central openings and/or corner openings may not require the same accuracy as the swirl-spoke grooves, whereby these openings could be formed by one method before or after more precise openings are formed by another method.

Once the openings and grooves are formed, the plates are positioned in face-to-face contact and joined together. The joining process must produce fluid-tight seals not only between adjacent plates, but also around the openings and/or grooves defined by these plates. Brazing, welding, and diffusion-bonding may be possible methods for joining the plates/sheets together. In certain situations (e.g., lower temperature applications), it may even be possible to use adhesives to join the plates/sheets together, or even accomplish this joining by co-curing if, for example, the plates/sheets are made of a thermoplastic or other curable material. These and other suitable methods can be used, provided they can be accomplished without unacceptable deformation or blocking of the openings/grooves.

Once the nozzle plates are compiled in the stack 100, the inlet tubes 80 and 90 can be joined thereto in a fluid-tight manner. The tube-to-plate couplings can be accomplished, for example, by press-fit, welding, brazing, or any other suitable technique.

One may now appreciate the nozzle assembly can be constructed to occupy a very small envelope and still supply a uniform mixture of fuel and air. Although the nozzle assembly 10, the engine 12, the plate stack 100, and/or the plates 110-220 have been shown and described with respect to certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

The invention claimed is:

1. A nozzle assembly for injecting a fuel-air mixture into a combustion chamber; wherein:
   the nozzle assembly comprises a stack of a nozzle plates in face-to-face contact and joined together in a fluid tight manner;
   the plates include an upstream-most plate, a downstream-most plate, and a plurality of intermediate plates therebetween;
   the plates each include a central opening that align together to form a central circuit through which air passes from the upstream-most plate to the downstream-most plate;
   the upstream-most plate and at least some of the intermediate plates include openings that form corner air circuits through which air passes;
   at least some of the intermediate plates include openings and/or grooves that form swirl spokes in each corner air circuit into the central circuit to thereby merge the corner air circuit with the central circuit;
   the upstream-most plate and at least some of the intermediate plates include openings that form a first fuel circuit;
   at least some of the intermediate plates include openings and/or grooves that form swirl spokes from the fuel circuit into the central circuit to thereby merge the first fuel circuit with the central circuit; and the first fuel circuit merges with the central circuit upstream of where the corner air circuits merge with the central circuit.

2. A nozzle assembly as set forth in claim 1, wherein the upstream-most plate and at least some of the intermediate plates include openings that form a second fuel circuit; and wherein the second fuel circuit merges, via swirl spokes, with the central circuit.

3. A nozzle assembly as set forth in claim 2, wherein the second fuel circuit merges with the central circuit upstream of where the corner air circuits merge with central circuit.

4. A nozzle assembly as set forth in claim 3, wherein the second fuel circuit merges with central circuit through the same swirl spokes as the first fuel circuit.

5. A nozzle assembly as set forth in claim 1, comprising four corner air circuits and wherein at least three intermediate plates include grooves forming openings and/or grooves that form the swirl spokes that merge the corner air circuits with the central circuit.

6. A nozzle assembly as set forth in claim 5, wherein the central openings in the at least three intermediate plates forming the central circuit progressively grow in diameter in the downstream direction.

7. A nozzle assembly as set forth in claim 6 wherein the central opening in the downstream-most plate has a diameter greater than the central openings in the at least three intermediate plates.

8. A nozzle assembly as set forth in claim 1, wherein the first fuel circuit includes a distribution groove surrounding the central circuit, and a circular array of openings connecting the distribution groove to the swirl spokes that merge the first fuel circuit into the central circuit.

9. A nozzle assembly as set forth in claim 8, including at least four swirl spokes that merge the first fuel circuit with the central circuit.

10. A nozzle assembly as set forth in claim 9, including at least six swirl spokes that merge the first fuel circuit with the central circuit.

11. A nozzle assembly as set forth in claim 10, including at least eight swirl spokes that merge the first fuel circuit with the central circuit.

12. A nozzle assembly as set forth in claim 2, wherein the second fuel circuit includes a distribution groove surrounding the central circuit, and a circular array of small openings between the distribution groove and the swirl spokes that merge the second circuit with the central circuit.

13. A nozzle assembly as set forth in claim 1, comprising four corner air circuits and wherein at least three intermediate plates include grooves forming openings and/or grooves that form the swirl spokes that merge the corner air circuits with the central circuit;
wherein the first fuel circuit includes a distribution groove surrounding the central circuit, and a circular array of small openings between the distribution groove and the swirl spokes in the first fuel circuit that merge it with the central circuit; and
wherein the first fuel circuit includes at least four swirl spokes that merge the first fuel circuit into the central circuit.

14. A nozzle assembly as set forth in claim 13, wherein the upstream-most plate and at least some of the intermediate plates include openings that form a second fuel circuit; and wherein the second fuel circuit merges, via the same swirl spokes as the first fuel circuit, with the central circuit.

15. A nozzle assembly as set forth in claim 1, wherein the plates each include plural central openings, that align together to form plural central circuits through which air passes from the upstream-most plate to the downstream-most plate;
the upstream-most plate and at least some of the intermediate plates include openings that form corner air circuits through which air passes;
at least some of the intermediate plates include openings and/or grooves that form swirl spokes in each corner air circuit into the central circuit to thereby merge the corner air circuit with one of more of the central circuits;
the upstream-most plate and at least some of the intermediate plates include openings that form a first fuel circuit for each central circuit;
at least some of the intermediate plates include openings and/or grooves that form swirl spokes from each fuel circuit into the corresponding central circuit to thereby merge this fuel circuit with this central circuit; and
the first fuel circuits merge with the central circuits upstream of where the air circuits merge with the central circuits.

16. A nozzle assembly as set forth claim 15, wherein the upstream-most plate and at least some of the intermediate plates include openings that form a second fuel circuit for each central circuit; and wherein the second fuel circuits merge, via swirl spokes, with the central circuits.

17. A nozzle assembly as set forth in claim 16, wherein the second fuel circuits merge with the central circuits upstream of where the corner air circuits merge with central circuits.

18. A nozzle assembly as set forth in claim 17, wherein the second fuel circuits merge with central circuits through the same swirl spokes as the first fuel circuits.

19. A gas turbine engine comprising a combustion chamber and the nozzle assembly set forth in claim 1 positioned to inject a fuel-air mixture into the combustion chamber.

20. A method of using the nozzle assembly as set forth in claim 1, said method comprising the steps of supplying a first fluid to a first inlet of the first fuel circuit and
supplying a second fluid to a second outlet of a second fuel circuit, wherein both the first fluid and the second fluid are jet fuel.

* * * * *